US009266998B2

(12) United States Patent
Kues et al.

(10) Patent No.: US 9,266,998 B2
(45) Date of Patent: Feb. 23, 2016

(54) SCRATCH-RESISTANT-COATED POLYCARBONATES WITH HIGH TRANSPARENCY, PROCESS FOR THEIR PRODUCTION, AND THEIR USE

(75) Inventors: Jan-Bernd Kues, Muenster (DE); Matthijs Groenewolt, Muenster (DE); Karin Homann, Steinfurt (DE); Stefanie Schroeder, Muenster (DE); Andre Brosseit, Hamm (DE)

(73) Assignee: BASF COATINGS GMBH, Muenster (DE)

( * ) Notice: Subject to any disclaimer, the term of this patent is extended or adjusted under 35 U.S.C. 154(b) by 433 days.

(21) Appl. No.: 13/383,751

(22) PCT Filed: Mar. 27, 2010

(86) PCT No.: PCT/EP2010/001960
§ 371 (c)(1),
(2), (4) Date: Feb. 15, 2012

(87) PCT Pub. No.: WO2011/006552
PCT Pub. Date: Jan. 20, 2011

(65) Prior Publication Data
US 2012/0262664 A1 Oct. 18, 2012

(30) Foreign Application Priority Data
Jul. 14, 2009 (DE) .......................... 10 2009 032 921

(51) Int. Cl.
| C08G 18/68 | (2006.01) |
| G02B 1/11 | (2015.01) |
| G02C 7/10 | (2006.01) |
| B32B 27/08 | (2006.01) |
| B32B 3/02 | (2006.01) |
| C08G 18/81 | (2006.01) |
| C08F 290/06 | (2006.01) |
| C08F 299/02 | (2006.01) |
| C08J 7/04 | (2006.01) |
| C09D 175/16 | (2006.01) |

(52) U.S. Cl.
CPC ........ C08G 18/8116 (2013.01); C08F 290/067 (2013.01); C08F 299/024 (2013.01); C08G 18/8175 (2013.01); C08J 7/047 (2013.01); C09D 175/16 (2013.01); C08J 2369/00 (2013.01); C08J 2475/00 (2013.01); Y10T 428/31507 (2015.04)

(58) Field of Classification Search
CPC ............ C08F 290/067; C08F 299/024; C08G 18/8116; C08G 18/8175; C09D 175/16; Y10T 428/31507; C08J 7/047; C08J 2369/00; C08J 2475/00
USPC ......... 428/412, 64.7, 423.1; 359/601; 351/41, 351/44; 427/471, 491, 498, 512; 522/90
See application file for complete search history.

(56) References Cited

U.S. PATENT DOCUMENTS

| 3,022,272 A | 2/1962 | Schnell et al. |
| 4,018,941 A | 4/1977 | Tucker |
| 4,314,933 A * | 2/1982 | Berner .......................... 523/456 |
| 5,340,905 A | 8/1994 | Kuhling et al. |
| 5,399,659 A | 3/1995 | Kuhling et al. |
| 6,420,451 B1 | 7/2002 | Lin et al. |
| 2003/0232933 A1 | 12/2003 | Lagneaux et al. |
| 2006/0008596 A1* | 1/2006 | Pokorny et al. ................ 428/1.1 |
| 2007/0231577 A1 | 10/2007 | Caillouette et al. |
| 2007/0237967 A1* | 10/2007 | Buckel et al. .............. 428/423.1 |
| 2008/0139753 A1 | 6/2008 | Spyrou et al. |
| 2008/0198446 A1* | 8/2008 | Asakura et al. ................ 359/352 |
| 2011/0195256 A1* | 8/2011 | Morikawa et al. ............ 428/412 |

FOREIGN PATENT DOCUMENTS

| DE | 1031512 | 6/1958 |
| EP | 1036834 A1 | 9/2000 |
| JP | 2003137964 A * | 5/2003 |
| JP | 2008-056906 A | 3/2008 |
| WO | WO-0164803 A1 | 9/2001 |
| WO | WO-2006028518 A2 | 3/2006 |

OTHER PUBLICATIONS

International Search Report (in German with English translation) and Written Opinion (in German) for PCT/EP2010/001960, mailed Oct. 7, 2010; ISA/EP.

* cited by examiner

*Primary Examiner* — Thao T Tran
(74) *Attorney, Agent, or Firm* — Quinn Law Group, PLLC

(57) ABSTRACT

The present invention relates to a process for the coating of polycarbonate substrates, in particular of transparent polycarbonate substrates, by applying a transparent coating composition encompassing at least one radiation-curing binder resin (A) and/or reactive diluent (C), nanoparticles (B), optionally solvent and at least one light stabilizer (L), to a polycarbonate substrate, wherein the coating composition comprises at least one light stabilizer (L) which comprises, per molecule, an average of at least one ethylenically unsaturated group bonded by way of a urethane group.
The present invention also relates to the coating compositions used in said process, and to the coated polycarbonate substrates obtainable via the process, and to their use.

20 Claims, No Drawings

SCRATCH-RESISTANT-COATED POLYCARBONATES WITH HIGH TRANSPARENCY, PROCESS FOR THEIR PRODUCTION, AND THEIR USE

This application is a 371 U.S. National Stage of International Application No. PCT/EP2010/001960, filed Mar. 27, 2010, which claims the benefit of German Patent Application No. DE 10 2009 032 921.8, filed Jul. 14, 2009, the disclosures of both of these applications being incorporated herein by reference.

The present invention relates to a process for the coating of polycarbonate substrates by applying a coating composition encompassing at least one radiation-curing binder resin (A) and/or reactive diluent (C), nanoparticles (B), optionally solvent and at least one light stabilizer (L) to a polycarbonate substrate, to coating compositions suitable for this purpose, and to the coated polycarbonate substrates obtainable via the process.

For some years now, transparent plastics have increasingly been used as materials to replace glass, for example for the production of sheets, windows, spectacle lenses, optical lenses or windshields of automobiles and of aircraft. Particular plastics that have become established are those based on polycarbonates and on polymethyl methacrylates.

The use of plastics of this type is of particular interest for the automobile sector, since the plastics permit realization of shapes which cannot be realized, or require unacceptable levels of resource to realize, when the material used is glass. By way of example, polycarbonate has achieved rapid acceptance for the "glazing" of automobile headlamps.

Alongside easy formability, another significant advantage of plastics, such as polycarbonate, is that their relative density is substantially lower in comparison with glass, thus permitting, for example, a marked reduction in the weight of a vehicle.

Polycarbonate also has better elastic toughness properties than glass, and it therefore has better capability to absorb stone impacts via energy dissipation. However, a disadvantage of plastics is that they are less hard than glass. The result of this is lower resistance to external mechanical damage and therefore lower scratch resistance and lower abrasion resistance. Particularly when materials of this type are used in environments subject to severe stresses, it is therefore necessary to protect them from abrasion and scratching.

However, there are stringent requirements specifically in the automobile glazing sector, defined by the standards ECE 43, ASTM 1044, ASTM 1003.

Polymer systems of varying constitution can be used to coat polycarbonate with a scratch-resistant layer exhibiting excellent results in the abrasion test (Taber test).

Various sol-gel systems are used for this purpose, some of which also use plasma processes. These systems are often produced from modified silanes and alkoxides via hydrolysis and condensation processes. The shelf life of the coating mixture is mostly very short, because of the reactivity of said systems. The setting of relatively high solids contents also makes it more difficult to achieve stability in these systems.

Radiation-curable coating compositions are also used for the coating of polycarbonate substrates. By way of example, U.S. Pat. No. 6,420,451 describes radiation-curable coating compositions for the coating of optical substrates, such as lenses, composed of various plastics substrates, an example being polycarbonate. The coating compositions comprise urethane acrylates and colloidal metal oxides, and in particular $SiO_2$ particles, alongside monofunctional acrylates. Because of their content of metal oxide particles, these coating compositions lead to coatings with improved scratch resistance, and they also have good adhesion to various substrates and good compatibility with antireflective coatings, when optical lenses are coated. The coating compositions described in that document moreover preferably also comprise conventional light stabilizers. However, in order to ensure good compatibility of the light stabilizers with the binder resins, this in turn being essential if the resultant coatings are to have very good transparency, the only light stabilizer whose use is recommended is 2,2',4,4'-tetrahydroxybenzophenone. However, there is no information given as to how very high transparency of the resultant coatings could also be achieved with other light stabilizers, and nor is any information given as to how very good weathering resistance of the resultant coatings can be achieved.

WO06/028518 UV also describes curable coating compositions which comprise at least one radiation-curable (meth)acrylate, inorganic nanoparticles, in particular surface-modified $SiO_2$ nanoparticles with a particle size of 5 to 80 nm and with a narrow particle size distribution, optionally reactive diluent and optionally light stabilizer. Preference is given to use of saturated light stabilizers without ethylenic double bonds. Said coating compositions are used for the production of coatings with improved abrasion resistance, in particular of plastics substrates, e.g. road reflectors, or of coatings with improved stability, for example the coating of filter papers, e.g. for oil filters. However, WO06/028518 does not describe polycarbonate substrates.

As stated above, coating compositions suitable for the coating of polycarbonate are not merely required to be curable to give scratch-resistant coatings, but must in addition lead to transparent coatings with very good optical properties and with very good adhesion, even after stress due to storage in water. WO06/028518 does not contain any appropriate information as to how it is possible to achieve the transparency of the coated substrates, and the good adhesion to polycarbonate, which are required alongside scratch resistance.

WO01/64803 then discloses coating compositions in particular for the production of clear coats, comprising at least one (meth)acrylate copolymer, which comprise at least one copolymerized light stabilizer.

This gives these coating compositions improved transparency and weathering resistance when they are compared with corresponding coating compositions using conventional light stabilizers. The light stabilizers described in that document have (meth)acrylate groups linked by way of their ester function (i.e. they were introduced by way of a reaction of hydroxy groups in the light stabilizer with (meth)acrylic acid). The light stabilizers are preferably pre-incorporated into the binder resins, i.e. the (meth)acrylate groups have been consumed by reaction prior to the crosslinking of the coating compositions. Again, no polycarbonate substrates are described in said specification. Similarly, that specification again gives no information as to how it is possible to ensure that the resultant coatings have better transparency than automobile clear coats.

OBJECT

It was therefore an object of the present invention to provide coating compositions which are suitable for the coating of polycarbonate substrates. The coating compositions should therefore lead to cured coatings with high transparency and with little gray haze (haze values of the unstressed coating smaller than 1, preferably smaller than 0.8, respectively determined with the aid of a Haze-gard plus C4725 device from BYK-Gardner) and with low yellowness indices (yellowness indices of the unstressed coating smaller than 2.5, preferably smaller than 1.5, respectively measured to the standard ASTM E313).

The coating compositions should moreover lead to cured coatings with very good adhesion (in particular determined by means of the adhesive tape test to ASTM D3359 and ISO 2409) on polycarbonate substrates, even after stress due to storage in water, and in particular in what is known as the water immersion test to ASTM 870-02 and ISO 2812-2.

The coating compositions should moreover lead to cured coatings with good weathering resistance, in particular determined by the abbreviated weathering test PV3990 in accordance with specification VW PV-3920 Nov03 and/or in the CAM180 test (to DIN EN ISO 11341 Feb 98 and DIN EN ISO 4892-2 Nov 00). The coating compositions should moreover lead to cured coatings with good scratch resistance and good abrasion resistance.

Finally, the coating composition should be easy to handle and have good processing viscosity and also good flow.

Achievement of the Object

In the light of the abovementioned object, a process has been found for the coating of polycarbonate substrates, in particular of transparent polycarbonate substrates, by applying a transparent coating composition encompassing at least one radiation-curing binder resin (A) and/or reactive diluent (C), nanoparticles (B), optionally solvent and at least one light stabilizer (L), to a polycarbonate substrate, wherein the coating composition comprises at least one light stabilizer (L) which comprises, per molecule, an average of at least one ethylenically unsaturated group bonded by way of a urethane group, in particular acrylate or methacrylate or acrylate and methacrylate groups bonded by way of urethane groups.

The present invention also provides the coating compositions used in said process, and the coated polycarbonate substrates obtainable via the process, and their use.

With regard to the prior art, it was surprising and not foreseeable by a person skilled in the art that the objects underlying the present invention could be achieved with the aid of the process of the invention.

In particular, it is surprising that by virtue of the light stabilizers used in the invention, having ethylenically unsaturated groups bonded by way of urethane groups, in particular acrylate and, respectively, methacrylate groups, not only the yellowness indices of the resultant unstressed coating but also the yellowness indices of the resultant coating after weathering are markedly lower than those of coatings obtained from corresponding coating compositions which comprise unmodified hydroxylated light stabilizers or light stabilizers in which the acrylate and, respectively, methacrylate groups have been bonded to the light stabilizer by way of their ester function. In particular, the yellowness indices of the unstressed coating are smaller than 2.5, preferably smaller than 1.5, in each case measured to the standard ASTM E313.

The coating compositions of the invention can moreover be cured to give transparent coatings without gray haze, i.e. with low haze values smaller than 1, preferably smaller than 0.8, respectively determined with the aid of a BYK-Gardner Haze-gard plus C4725 device.

Another advantage is that by virtue of the light stabilizers used in the invention having acrylate and, respectively, methacrylate groups bonded by way of urethane groups the adhesion of the resultant coatings on polycarbonate substrates after water immersion, and the weathering resistance of the resultant coatings, are markedly better than those of corresponding coatings based on coating compositions which comprise unmodified hydroxylated light stabilizers or light stabilizers in which the acrylate and, respectively, methacrylate groups have been bonded by way of their ester function to the light stabilizers.

The coatings obtained in the invention moreover feature good scratch resistance and good abrasion resistance, i.e. the composite composed of polycarbonate substrate and coating satisfies the Taber test requirement.

Another advantage is that the coating compositions used in the invention are easy to handle and have good processing viscosity, and good flow.

DESCRIPTION OF THE INVENTION

Coating Composition Used in the Invention
    The Light Stabilizer (L)
    It is essential to the invention that the coating composition comprises at least one light stabilizer (L) which comprises, per molecule, an average of at least one ethylenically unsaturated group bonded by way of urethane groups. In contrast to the usual linkage, in commercially available light stabilizers, of the UV-reactive group by way of the ester function of the (meth)acrylate groups, a consequence of the linkage of the ethylenically unsaturated group in the invention by way of a urethane group is that not only the haze values and the yellowness indices of the resultant unstressed coating but also the haze values and the yellowness indices of the resultant coating after weathering are markedly lower.

It is preferable that the coating composition comprises at least one light stabilizer (L) which comprises, per 100 g of light stabilizer, 1.0 to 20.0 g of ethylenically unsaturated groups bonded by way of urethane groups, in particular, per 100 g of light stabilizer, 3.0 to 15.0 g of ethylenically unsaturated groups bonded by way of urethane groups. The content of ethylenically unsaturated groups bonded by way of urethane groups here in the light stabilizer is preferably determined experimentally with the aid of NMR spectroscopy, for example using a Varian DirectDrive 500 spectrometer. A triple determination is carried out here by respectively dissolving 150 mg of the analysis specimen, in each case in 1 ml of $CDCl_3$, with addition of 1 mg of dimethyl terephthalate as internal standard, and carrying out spectroscopic analysis of this sample.

As is known, it is also possible to make a theoretical estimate of the double bond content by assuming idealized structures and by assuming complete conversion of all of the structural components and taking into account the parameters stated for the structural components, examples being, where appropriate, molecular weight, isocyanate content, double bond contents and content, in the light stabilizers, of groups reactive toward the isocyanate groups.

As a general rule here, the scratch resistance of the resultant coating rises with rising content of ethylenically unsaturated groups in the light stabilizers.

It is preferable in the invention to use light stabilizers (L) which have, per molecule, an average of at least one acrylate or methacrylate group bonded by way of a urethane group. It is particularly preferable in the invention to use light stabilizers (L) which comprise, per 100 g of light stabilizer, 1.0 to 20.0 g respectively of acrylate or methacrylate or acrylate and methacrylate groups bonded by way of urethane groups, in particular 3.0 to 15.0 g respectively of acrylate or methacrylate or acrylate and methacrylate groups bonded by way of urethane groups.

Examples that may be mentioned of light stabilizers (L) used in the invention are the corresponding radiation-curable light stabilizers having an average of at least one ethylenically unsaturated group bonded by way of a urethane group, in particular acrylate and/or methacrylate groups, based on sterically hindered amines and/or on UV absorbers, for example on triazoles, on triazines, on benzophenones, on oxalanilides, or else on a mixture of these.

It is preferable that the coating composition comprises, as light stabilizer (L), a mixture composed of a light stabilizer (L1) based on a sterically hindered amine and of a light stabilizer (L2) based on a UV absorber, where either
(i) the light stabilizer (L1) or
(ii) the light stabilizer (L2) or
(iii) the light stabilizer (L1) and the light stabilizer (L2)
contain(s), per molecule, an average of at least one ethylenically unsaturated group bonded by way of urethane groups, in particular acrylate groups or methacrylate groups, or both acrylate and methacrylate groups, bonded by way of urethane groups. It is preferable that the light stabilizer (L) or the light stabilizer (L1) or the light stabilizer (L2) or both the light stabilizer (L1) and the light stabilizer (L2) comprise(s), per 100 g of light stabilizer, 1.0 to 20.0 g respectively of acrylate or methacrylate or acrylate and methacrylate groups bonded by way of urethane groups, in particular 3.0 to 15.0 g respectively of acrylate or methacrylate or acrylate and methacrylate groups bonded by way of urethane groups.

It is particularly preferable that the coating composition comprises, as light stabilizer (L), a mixture composed of a light stabilizer (L1) based on a sterically hindered amine and of a light stabilizer (L2) based on a UV absorber, where the light stabilizer (L1) and the light stabilizer (L2) respectively contain acrylate or methacrylate or acrylate and methacrylate groups bonded by way of urethane groups.

Preference is also given to coating compositions which comprise at least one light stabilizer, in which the method by which the acrylate or methacrylate or acrylate and methacrylate groups were introduced into the light stabilizer is that
(i) a light stabilizer (L") having at least one group (LG) reactive toward isocyanate groups or a light stabilizer (L1") having at least one group (LG) reactive toward isocyanate groups or a light stabilizer (L2") having at least one group (LG) reactive toward isocyanate groups or a mixture composed of a light stabilizer (L1") having at least one group (LG) reactive toward isocyanate groups and of a light stabilizer (L2") having at least one group (LG) reactive toward isocyanate groups was reacted with a compound (V) comprising isocyanate groups, and
(ii) the light stabilizer (L') and, respectively, (L1') and, respectively, (L2') obtained in stage (i) and comprising isocyanate groups was reacted with a hydroxyalkyl ester of acrylic acid or with a hydroxyalkyl ester of methacrylic acid or with a mixture composed of a hydroxyalkyl ester of acrylic acid and of a hydroxyalkyl ester of methacrylic acid.

Examples of suitable light stabilizer (L") having at least one group (LG) reactive toward isocyanate groups are light stabilizers which have at least one hydroxy group and/or amino group, preferably hydroxy group, reactive toward isocyanate groups. Particular mention may be made of hydroxylated sterically hindered amines, and also of hydroxylated UV absorbers in which the hydroxy group has no bonding to the UV-absorbent unit, examples being the corresponding hydroxylated triazoles, hydroxylated triazines, hydroxylated benzophenones, and hydroxylated oxalanilides.

Examples of suitable hydroxylated light stabilizers (L1") based on a sterically hindered amine are therefore 2,4-bis[N-butyl-N-(1-cyclohexyloxy-2,2,6,6-tetramethylpiperidin-4-yl)amino]-6-(2-hydroxyethylamino)1,3,5-triazine (commercially available Tinuvin® 152 light stabilizer from Ciba Specialty Chemicals), bis(1,2,2,6,6-pentamethyl-4-piperidinyl)2-butyl-2-(4-hydroxy-3,5-di-tert-butylbenzyl)propanedioate (commercially available Tinuvin® 144 light stabilizer from Ciba Specialty Chemicals) and/or 4-hydroxy-2,2,6,6-tetramethyl-1-piperidineethanol butanedicarbonxylic acid polymer (commercially available Tinuvin® 622LD light stabilizer from Ciba Specialty Chemicals).

Examples of suitable hydroxylated light stabilizers (L2") which are based on a UV absorber and in which the hydroxy function has no bonding to the UV-absorbent unit are hydroxyphenyltriazines, for example a mixture composed of 2-[4-[(2-hydroxy)-3-dodecyloxypropyl]oxy]-2-hydroxyphenyl]-4,6-bis(2,4-dimethylphenyl)-1,3,5-triazine and 2-[4-[(2-hydroxy)-3-tridecyloxypropyl]oxy]-2-hydroxyphenyl]-4,6-bis(2,4-dimethylphenyl)-1,3,5-triazine (commercially available Tinuvin® 400 light stabilizer from Ciba Specialty Chemicals), 2-[4-[(2-hydroxy)-3-(2'-ethyl)hexyl)oxy]-2-hydroxyphenyl]-4,6-bis(2,4-dimethylphenyl)-1,3,5-triazine (commercially available Tinuvin® 405 light stabilizer from Ciba Specialty Chemicals), a mixture composed of β-[3-(2-H-benzotriazol-2-yl)-4-hydroxy-5-tert-butylphenyl]propionic acid-poly(ethylene glycol) 300-ester and bis{β-[3-(2-H-benzotriazol-2-yl)-4-hydroxy-5-tert-butylphenyl]propionic acid-poly(ethylene glycol) 300-ester (commercially available Tinuvin® 1130 light stabilizer from Ciba Specialty Chemicals).

Particularly preferred coating compositions are obtained if, for the reaction with the compound (V) containing isocyanate groups, in stage (i),
(i) the hydroxylated light stabilizer (L1") is 2,4-bis[N-butyl-N-(1-cyclohexyloxy-2,2,6,6-tetramethylpiperidin-4-yl)amino]-6-(2-hydroxyethylamino)-1,3,5-triazine (commercially available Tinuvin® 152 light stabilizer from Ciba Specialty Chemicals)
and/or
(ii) the light stabilizer (L2") having at least one group (LG) reactive toward isocyanate groups is a mixture composed of 2-[4-[(2-hydroxy)-3-dodecyloxypropyl]oxy]-2-hydroxyphenyl]-4,6-bis(2,4-dimethylphenyl)-1,3,5-triazine and 2-[4-[(2-hydroxy)-3-tridecyloxypropyl]oxy]-2-hydroxyphenyl]-4,6-bis(2,4-dimethylphenyl)-1,3,5-triazine (commercially available Tinuvin® 400 light stabilizer from Ciba Specialty Chemicals).

In principle, a suitable compound (V) containing isocyanate groups is any of the substituted or unsubstituted aromatic, aliphatic, cycloaliphatic, and/or heterocyclic isocyanates known per se. The compound (V) used containing isocyanate groups in particular comprises compounds which contain an average of at least 2 isocyanate groups per molecule, in particular 2 to 8 isocyanate groups per molecule, and very particularly more than 2 to 4 isocyanate groups per molecule.

Examples of suitable compounds (V) are: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyldiphenylene 4,4'-diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, dodecane 1,12-diisocyanate, cyclobutane 1,3-diisocyanate, cyclohexane 1,3-diisocyanate, cyclohexane 1,4-diisocyanate, methylcyclohexyl diisocyanate, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, methylenedicyclohexyl 4,4'-diisocyanat (e.g. Desmodur W from Bayer AG), tetramethylxylyl diisocyanates (e.g. TMXDI® from American Cyanamid), and mixtures of the abovementioned polyisocyanates. Other suitable compounds (V) are the biuret dimers, the uretdiones, the allophanates, and the isocyanurate trimers of the above-mentioned diisocyanates. It is preferable to use aliphatic and/or cycloaliphatic diisocyanates and their biuret dimers, uretdiones, allophanates, and isocyanurate trimers. Particularly preferred compounds (V) are hexamethylene 1,6-diisocyanate, isophorone diisocyanate, and methylenedicyclohexyl 4,4'-diisocyanate, and their biuret dimers, and/or isocyanurate trimers.

In particular for improving the scratch resistance of the resultant coating, the reaction with the light stabilizer (L") and, respectively, (L1") and, respectively, (L2") in each case having at least one group (LG) reactive toward isocyanate groups can also use compounds (V') which contain isocyanate groups and which contain an average of at least 1 ethylenically unsaturated double bond per molecule. It is also, of course, possible that the light stabilizer (L") having at least one group (LG) reactive toward isocyanate groups, or the light stabilizer (L1") having at least one group (LG) reactive toward isocyanate groups, or the light stabilizer (L2") having at least one group (LG) reactive toward isocyanate groups, or a mixture composed of the light stabilizer (L1") and of the light stabilizer (L2") having in each case at least one group (LG) reactive toward isocyanate groups is reacted with a mixture composed of a saturated compound (V) containing isocyanate groups and of a compound (V') which contains isocyanate groups and which contains an average of at least 1 ethylenically unsaturated double bond per molecule.

Preference is given here to use of compounds (V') which contain an average of 2 to 8 ethylenically unsaturated double bonds per molecule, in particular an average of 2 to 4 ethylenically unsaturated double bonds per molecule.

An example of suitable compounds (V') which contain isocyanate groups and which contain an average of at least 1 ethylenically unsaturated double bond per molecule is provided by any of the corresponding oligomeric and/or polymeric compounds such as the following unsaturated compounds containing isocyanate groups: polyester acrylates and polyester methacrylates, polycarbonates, urethane acrylates and urethane methacrylates, unsaturated polysiloxanes containing isocyanate groups, and the like. Preference is given to use of urethane acrylates and/or of urethane methacrylates, and in particular here of aliphatic urethane acrylates and/or of aliphatic urethane methacrylates.

The light stabilizer (L') obtained in stage (i) and containing isocyanate groups, and/or the light stabilizer (L1') and/or (L2') obtained in stage (i) and containing isocyanate groups, is then reacted in a further stage with the hydroxyalkyl ester of an ethylenically unsaturated mono-, and/or di-, and/or polycarboxylic acid. Examples that may be mentioned of suitable hydroxyalkyl esters are the acrylic and/or methacrylic esters, and/or the fumaric, crotonic, and/or maleic esters, with saturated and/or unsaturated diols and/or polyols.

It is preferable that the light stabilizer (L') obtained in stage (i) and containing isocyanate groups, and/or the light stabilizer (L1') obtained in stage (i) and containing isocyanate groups, and/or the light stabilizer (L2') obtained in stage (i) and containing isocyanate groups is reacted with a hydroxyalkyl ester of acrylic acid and/or of methacrylic acid, particularly preferably with hydroxyethyl acrylate, hydroxyethyl methacrylate, trimethylolpropane diacrylate, trimethylolpropane dimethacrylate, pentaerythritol diacrylate, pentaerythritol dimethacrylate, pentaerythritol triacrylate, pentaerythritol trimethacrylate, or a mixture of these.

The coating composition of the invention usually comprises 2.5 to 60.0% by weight, preferably 5.0 to 40.0% by weight, particularly preferably 10.0 to 30.0% by weight, of the light stabilizer (L), or 2.5 to 60.0% by weight, preferably 5.0 to 30.0% by weight, particularly preferably 5.0 to 15.0% by weight, of the light stabilizer (L1), and/or 2.5 to 60.0% by weight, preferably 5.0 to 30.0% by weight, particularly preferably 5.0 to 15.0% by weight, of the light stabilizer (L2), where all of the % by weight data are respectively based on the weight of the binder resin (A) plus the weight of the nanoparticles (B) plus the weight of the optionally used reactive diluent (C).

It is, of course, also possible to use one or more other light stabilizers (L3) together with the light stabilizer (L), or together with the light stabilizer (L1), or together with the light stabilizer (L2), or together with the light stabilizers (L1) and (L2), where the light stabilizers (L3) do not have any ethylenically unsaturated groups bonded by way of urethane groups. The other light stabilizer (L3) used can be any of the light stabilizers usually used. These other light stabilizers (L3) can be saturated or unsaturated light stabilizers, but it is preferable here to use ethylenically unsaturated light stabilizers (L3). The double bond in these ethylenically unsaturated light stabilizers (L3) typically has bonding by way of an ester group.

An example that may be mentioned of suitable other light stabilizers (L3) is provided by the abovementioned, unmodified hydroxylated light stabilizers (L1") based on sterically hindered amines, and also by the unmodified hydroxylated light stabilizers (L2") based on UV absorbers. An example that may be mentioned of suitable ethylenically unsaturated light stabilizers (L3) is (2-(2'-hydroxy-5'-methacryloxyethylphenyl)-2H-benzotriazole (commercially available Tinuvin® R796 light stabilizer from is Ciba Specialty Chemicals), 2,2,6,6-tetramethylpiperidyl 4-methacrylate (commercially available light stabilizer based on a sterically hindered amine, ADK STAB LA-87 from Adeka Palmarole), or else the ethylenically unsaturated light stabilizers (a1) to (a4) listed in WO01/64803.

However, particularly preferred coating compositions are obtained if all of the light stabilizers used have ethylenically unsaturated double bonds, i.e. the only light stabilizers present in the coating compositions are the following light stabilizers of the invention: (L) or (L1) or (L2) or (L1) plus (L2), and also, if appropriate, ethylenically unsaturated light stabilizers (L3). Very particular preference is given to coating compositions which comprise exclusively the following light stabilizers of the invention: (L) or (L1) or (L2) or (L1) plus (L2).

The Radiation-Curable Binder (A)

In principle, any oligo- or polymers, in the form of what are known as prepolymers, can be used, where these are accessible to a radiation-induced polymerization reaction. Binder resin components (A) of this type preferably possess at least two ethylenically unsaturated terminal groups. Examples of suitable ethylenically unsaturated terminal groups are acrylate groups or methacrylate groups. The at least two ethylenically unsaturated terminal groups here can be identical or different. While acrylate groups are preferred terminal groups for UV-curing systems, methacrylates are often cured by way of electron-beam radiation.

The proportion of the ethylenically unsaturated terminal groups is preferably 2 to 20, particularly preferably 2 to 14, very particularly preferably 2 to 9, and most preferably 2 to 8. The ethylenically unsaturated terminal groups within a binder resin molecule can be identical or different, i.e. it is possible that, for example, acrylate groups are present alongside methacrylate groups or alongside other ethylenically unsaturated groups.

If acrylate groups and/or methacrylate groups are present as ethylenically unsaturated terminal groups of the binder resin, the structure of the binder resin can be represented by the general formula (I)

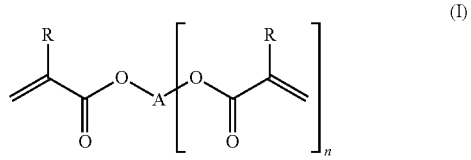

in which the moieties R, independently of one another, are hydrogen or a methyl group, n is 1 to 19, and A is an (n+1)-valent oligomeric or polymeric moiety. A has preferably been selected from the group of the polyurethanes, polyesters, polyethers, polymelamines, polyallophanates, polyisocyanurates, polyepoxides, and polysiloxanes. The value of n is preferably 1 to 19, preferably 1 to 13, particularly preferably 1 to 8, and very particularly preferably 1 to 7.

The coated polycarbonate substrates produced by the process of the invention have increased scratch resistance, for all moieties A. Binder resins of the general formula (I) which have proven particularly advantageous with regard to additional chemicals resistance are those in which A is a polyurethane moiety, polyester moiety, polyallophanate moiety, or polyisocyanurate moiety. Polyurethanes are particularly preferred as moieties A with regard to additional weathering resistance.

Resins of the general formula (I) are generally termed radiation-curing acrylate resins or radiation-curing methacrylate resins. In contrast to traditional acrylate resins or traditional methacrylate resins, the radiation-curing resins possess at least two terminal carbon double bonds. In the present specification, "terminal" means the alpha and omega positions in the molecule in the case of an exclusively linear divalent moiety A, but where A has comb-type and dendritic structures "terminal" also covers the ends of the combs or the ends of the arms.

The compounds of the general formula (I) are obtained via the incorporation of terminal acrylic or methacrylic acid moieties onto the prepolymers derived from the moieties A. If the moieties A comprise terminal hydroxy groups, it is possible to condense acrylic acid and, respectively, methacrylic acid onto the moiety, with formation of an ester bond. If A bears terminal amino groups, amide bonds are produced instead of the ester bonds. In principle, it is possible to use any of the coupling strategies familiar to the person skilled in the art in this sector. By way of example, terminal isocyanate groups of the moieties A can be reacted with hydroxy esters of acrylic acid or methacrylic acid. It is also possible that an addition reaction takes place between the carboxy group of the acrylic acid or methacrylic acid and epoxy groups. Again here, hydroxy groups are produced, and these are accessible to a reaction with acrylic acid or methacrylic acid or with the acid chlorides thereof.

Examples of the binder resins which crosslink via UV irradiation, preferably by a free-radical route, and which have at least two ethylenically unsaturated terminal groups are multiacrylic- and/or multimethacrylic-functionalized polyurethanes, polyesters, polyethers, polymelamines, polyallophanates, polyisocyanurates, polyepoxides, and polysiloxanes, and oligomeric forms thereof, and also mixed forms thereof, for example mixed polyester urethanes. "Multifunctional" here means at least "difunctional".

By way of example, multiacrylate-functionalized binder resins can be used, examples being an epoxy diacrylate (Craynor 132 from Sartomer), a propoxylated pentaerythritol triacrylate (Photomer 4171 from Cognis Deutschland GmbH & Co. KG), a melamine pentaacrylate (Actilane 890 from Akzo Nobel Chemical GmbH), an aliphatic urethane hexaacrylate oligomer (Ebecryl® 1290 from UCB GmbH), an aliphatic urethane tetraacrylate oligomer (Sartomer® CN 925 from Craynar) or an ester acrylate (DPHA from UCB GmbH).

The properties of the cured coating, in particular with regard to its chemicals resistance, lightfastness, toughness, adhesion, and abrasion resistance, can be influenced via the selection of the main polymer chain A or main oligomer chain A of the binder resin, i.e. the selection of, for example, polyurethane, polyester, polyether, polymelamine, polyallophanate, polyisocyanurate, polyepoxide, or polysiloxanes. Polyurethanes, polyesters, and polyethers prove especially advantageous in their combination of the abovementioned properties, and among these particular preference is given to polyurethanes and polyesters.

As far as the architecture of the compounds is concerned, it is also possible to use those having comb-type or preferably dendritic structures, alongside the linear compounds of the general formula (I). Among the compounds of the formula (I), particular preference is given to those having dendritic structures and having terminal acrylic acid groups and, respectively, methacrylic acid groups. Among these, preference is in turn given to those whose main oligomer chain is a dendritic polyester. These compounds feature relatively low viscosities even at high molar masses, permit high crosslinking densities, and can improve scratch resistance and chemicals resistance. Another feature of these compounds is rapid curing with very low shrinkage.

When acrylate- and/or methacrylate-modified dendritic polyesters are used, it is possible to omit any use of photoinitiators (PIs) entirely, in particular when, for example, the composition comprises aminic synergists, i.e. amines having a methylene group in the vicinity of the nitrogen. The function of the aminic synergists is to reduce oxygen inhibition, with formation of free radicals. The use of synergists can therefore be omitted when curing takes place with exclusion of oxygen, for example under an atmosphere of inert gas, for example nitrogen.

The Nanoparticles (B)

Particularly suitable nanoparticles (B) are oxidic inorganic nanoparticles whose average size is 1 to 500 nm, preferably 3 to 100 nm, particularly preferably 5 to 50 nm, and very particularly preferably 5 to 30 nm. However, nanoparticles naturally possess an average size in the nanometer range, and are thus delineated from particles whose average size is in the micrometer range (for example 1 μm and above). The term "oxidic inorganic" means that these are in essence nanoparticles composed of a metal oxide, for example aluminum oxide, or of a semimetal oxide, such as silicon dioxide. The latter can by way of example be obtained from aqueous alkali metal silicate solutions via acidification and subsequent drying. It is also possible to use what are known as fumed silicas, these being obtained via flame hydrolysis from silicon-halogen compounds. Another possibility is hydrolysis and condensation of organofunctional silanes, to produce aqueous or aqueous-alcoholic silica sols. The water content of these can be removed by way of example through azeotropic distillation. The average particle size is preferably determined by means of dynamic light scattering measurements (ALV goniometer, measurement angle 90°, temperature 23° C.), with evaluation of the results by the cumulant method.

However, particular preference is given to nanoparticles whose surface has been modified by condensing compounds onto the material. Surface modification usually takes place via coupling of the groups located on the surface of the nanoparticles, examples being hydroxy groups, to monomeric or oligomeric compounds. These monomeric or oligomeric compounds therefore comprise at least one group with affinity to the groups located on the surface of the nanoparticles. The coupling can by way of example take place via covalent bonding, ionic coupling, or physisorption. That portion of the monomeric or oligomeric compound not needed for coupling to the surface of the nanoparticles preferably protrudes entirely or to some extent into the medium surrounding the nanoparticles, and preferably contributes to improvement of compactability between nanoparticles on the one hand and components (A) and/or (C) on the other hand. It is preferable to use nanoparticles of this type.

The monomeric or oligomeric compounds used for surface modification can comprise not only the group required for coupling to the surface of the nanoparticles but also further functional groups which by way of example are capable of reacting with binder resin component (A). This type of surface modification is achieved by way of example when hydrolyzable silanes which bear ethylenically unsaturated groups are added to the oxidic nanoparticles, preferably silicas and, respectively, $SiO_2$ sols, or $SiO_2$ sol gels.

The surface modification of oxidic inorganic silica nanoparticles can take place via condensation of the silanes onto the surface of the nanoparticles. The manner of production of the nanoparticles here can be such that, starting from an alkali metal silicate solution, condensation of the same is brought about by using the effect of an acidic ion exchanger or of an acid, until the desired particle size is obtained, and then if appropriate after stabilization of the particles the silanes are added, whereupon these hydrolyze (to some extent) and condense onto the surface of the particles. The aqueous constituents are removed from the resultant sol if appropriate in vacuo, via (azeotropic) distillation.

Surface-modified silica nanoparticles are commercially obtainable by way of example from Byk as Nanobyk, or from nano resins AG in Geesthacht, Deutschland, as Nanopol®.

The nanoparticles (B) are preferably used in the form of a dispersion in solvents.

The Optional Solvent and/or Optional Reactive Diluent Used

The coating composition used in the process of the invention can also optionally comprise solvent. The coating composition used in the invention can also optionally comprise reactive diluent (C) in addition to the solvent or instead of the solvent. It is preferable here to use reactive diluents for reasons of avoidance of emissions, since the reactive diluents copolymerize with component (A). However, the selection of the reactive diluents and, respectively, solvents is to be such that these materials themselves, if they are used in unmixed form, or these materials in the mixture used comprising solvents and/or reactive diluents, are very substantially optically inert with respect to the polycarbonate substrate and preferably do not impair its transparency. The term "inert" means for these purposes that there is no visually discernible haze. However, the term "inert" does not exclude the possibility that the solvents and/or reactive diluents can solvate the polycarbonate substrate in a controlled manner, with possible resultant improvement in adhesion. Another function of the solvents and/or reactive diluents, in addition to reducing the viscosity of the coating compositions, is to permit maximization of uniformity of flow of the coating composition on the substrate.

Particularly suitable solvents are ethanol, isopropanol, n-butanol, ethyl acetate, butyl acetate, solvent naphtha, methyl ethyl ketone, 1-methoxy-propyl 2-acetate, acetone, or tetrahydrofuran, and particular preference is given here to combinations of various solvents. Combinations of the following solvents are particularly preferred: ethanol, isopropanol, n-butanol, ethyl acetate, butyl acetate, methyl ethyl ketone, and 1-methoxypropyl 2-acetate.

As is known, reactive diluents here are low-molecular-weight ethylenically unsaturated compounds, in particular monomeric ethylenically unsaturated compounds.

Examples of reactive diluents that can be used are low-molecular-weight acrylic esters or methacrylic esters. Among these are, for example, the acrylic esters and methacrylic esters of trimethylolpropane, pentaerythritol, and dipentaerythritol, alkoxylated glycerol triacrylate or alkoxylated glycerol trimethacrylate, for example propoxylated glycerol triacrylate or propoxylated glycerol trimethacrylate, tris(2-hydroxyethyl)isocyanotriacrylate, tris(2-hydroxyethyl)isocyanotrimethacrylate, acrylic-acid-modified carbonic esters, and oxazolidones, isobornyl acrylate, tetrahydrofuryl acrylates, 1,6-hexanediol diacrylate, lauryl acrylate, isodecyl acrylate, and octyldecyl acrylate.

Further Constituents of the Coating Composition Used in the Invention

The coating compositions used in the process of the invention can advantageously comprise photoinitiators (PIs). As described above, the addition of the photoinitiators is dependent, as far as the nature and amount thereof are concerned, on the binder resin (A) used, and indeed this addition can be omitted in the event that dendritic polyester acrylates are used. In the latter case it is, however, advantageous that the coating composition comprises aminic synergists.

Suitable photoinitiators are particularly those from the group consisting of alpha-hydroxyketones, alpha-aminoketones, phenylglyoxylates, benzyl dimethyl ketals, monoacylphosphines, bisacylphosphines, phosphine oxides, metallocenes, and iodonium salts. Preferred examples are inter alia 1-hydroxycyclohexyl phenyl ketone (Irgacure® 184), 2-hydroxy-2-methyl-1-phenyl-1-propanone (Irgacure® 1173), 2-hydroxy-1-{4-[4-(2-hydroxy-2-methylpropionyl)benzyl]phenyl}-2-methylpropan-1-one (Irgacure® 127), 2-hydroxy-1-[4-(2-hydroxyethoxy)phenyl]-2-methyl-1-propanone (Irgacure 2959), methylbenzoylformal (Darocure® MBF), phosphine oxide, phenylbis(2,4,6-trimethylbenzoyl) (Irgacure® 819) and diphenyl(2,4,6-trimethylbenzoyl)phosphine oxide (Lucirin® TPO).

The coating compositions of the invention advantageously also comprise conventional flow control agents, in particular flow control agents conventional in unsaturated coating compositions. It is preferable to use flow control additives which comprise one or more ethylenic double bonds which can react with the ethylenic double bonds of the binder resin during the curing process. Byk UV 3570 may be mentioned as an example of this type of flow control agent whose use is preferred.

Materials that can be present in the coating compositions used in the process of the invention, alongside the abovementioned constituents (A), and/or (C), (B), (L), and, if appropriate, (PI), and, if appropriate, the solvent, are further additives typical of clear coats, examples being flow control agents, adhesion promoters, devolatilizers, and wetting agents.

Components (A), (B), (PI), and also the additives typical of clear coats can be in dissolved or dispersed form when added to the coating composition used in the process of the invention. As far as the entire coating composition is concerned, the solvents used for this purpose and/or the reactive diluents of these components are to be classified with the reactive diluent (C) and, respectively, the solvent. This means that constituent (C) also encompasses the reactive diluents which pass into the coating composition by way of the other components. In order to ensure particularly good flow control of the coating and thus to obtain particularly smooth surfaces, commercially available flow control agents can be added to the coating composition that can be used in the invention, an example being Byk® 333, or BYK® 310. Additives of this type lower the surface tension of the UV coating, thus ensuring good wetting of the substrate under appropriate application conditions.

If necessary, it is possible to use adhesion promoters which ensure longlasting adhesion to the substrate (e.g. polycarbonate) and/or to primer. Examples of this class of additives are chlorinated polyolefins, acidic polyesters, or phosphoric acid adducts. The use of devolatilizers is sometimes also necessary, in order to avoid depressions in the surface of the coating. Commercially available devolatilizers are suitable for this purpose, examples being Byk-A 500, Byk-A 50, Byk-A 515, BYK 390, BYK 306, BYK 315, and BYK 356.

The coating compositions used in the invention preferably comprise, based on the weight of constituent (A) plus the weight of the nanoparticles (B) plus the weight of the optionally used reactive diluent (C):
(A) 0 to 95% by weight, preferably 10 to 80% by weight and particularly preferably 15 to 60% by weight, of at least one radiation-curing binder resin (A),
(B) 5 to 60% by weight, particularly preferably 10 to 55% by weight and very particularly preferably 30 to 50% by weight, of nanoparticles (B), and
(C) 0 to 95% by weight, particularly preferably 10 to 70% by weight, and very particularly preferably 10 to 40% by weight, of at least one reactive diluent inert toward polycarbonate, where the weight of the constituent (A) and of the nanoparticles (B) and the weight of the reactive diluent (C) always give a total of 100%. The amount used of the silicon dioxide nanoparticles (B), based on the total weight composed of constituent (A) plus (B) plus any reactive diluent, is 5 to 60% by weight, preferably 10 to 55% by weight, and particularly preferably 30 to 50% by weight.

If solvents are present, the amount present of these can be up to 80% by weight, based on the entire coating composition.

Finally, the coating composition preferably comprises 0 to 10% by weight, particularly preferably 1 to 6% by weight and very particularly preferably 2 to 4% by weight, of one or more photoinitiators (PI), where the amounts stated are based on the total weight of the binder resin (A) plus the weight of any reactive diluent (C) used, and
0 to 15% by weight, particularly preferably 0.5 to 10% by weight and very particularly preferably 0.5 to 5% by weight, of further additives typical of clear coats,
where the amounts stated are in each case based on the total weight of the coating composition.

Polycarbonate Substrate

Polycarbonate or polycarbonate substrate in the present invention means either homopolycarbonates or else copolycarbonates. As is known, the polycarbonates can be linear or branched. It is also possible that some of the carbonate groups of the homo- or copolycarbonates have been replaced by dicarboxylic ester groups or by other polycarbonate-compatible groups. Among the dicarboxylic ester groups, preference is given to aromatic dicarboxylic ester groups. If the polycarbonates comprise not only carbonic acid moieties but also dicarboxylic acid moieties, the term polyester carbonates is also used, and, as described above, these are likewise covered by the term polycarbonates. If dicarboxylic ester groups are present, the proportion of these present can be up to 80 mol %, preferably 20 to 50 mol %.

Polycarbonates can be produced by any of the processes known from the literature. Examples of suitable processes for the production of polycarbonates are production from bisphenols using phosgene by the phase interfacial process or by the homogeneous-phase process (pyridine process) or from bisphenols using carbonic esters by the melt transesterification process. These production processes are described by way of example in H. Schnell, "Chemistry and Physics of Polycarbonates", Polymer Reviews, volume 9, pp. 31 to 76, Interscience Publishers, New York, London, Sydney, 1964. The production processes mentioned are also described in D. Freitag, U. Grigo, P. R. Müller, H. Nouvertne, "Polycarbonates" in Encyclopedia of Polymer Science and Engineering, Volume 11, Second Edition, 1988, pages 648 to 718 and in U. Grigo, K. Kircher and P. R. Müller "Polycarbonate" [Polycarbonates] in Becker, Braun, Kunststoff-Handbuch [Plastics Handbook], volume 3/1, Polycarbonate, Polyacetale, Polyester, Celluloseester [Polycarbonates, polyacetals, polyesters, cellulose esters], Carl Hanser Verlag, Munich, Vienna 1992, pages 117 to 299. The melt transesterification process is in particular described in H. Schnell, "Chemistry and Physics of Polycarbonates", Polymer Reviews, volume 9, pp. 44 to 51, Interscience Publishers, New York, London, Sydney, 1964, and also in DE 10 31 512 A, U.S. Pat. No. 3,022,272, U.S. Pat. No. 5,340,905 and U.S. Pat. No. 5,399,659. The average molar mass Mw of the polycarbonates produced by the processes described above is preferably 12 000 to 400 000 g/mol, particularly preferably 18 000 to 80 000 g/mol and very particularly preferably from 22 000 to 60 000 g/mol.

The polycarbonates or polycarbonate substrates can take any desired three-dimensional shape, for example being sheets, windows, sound-deadening walls, spectacle lenses, optical lenses or parts of motor vehicles, e.g. motorcycles, buses, trucks or cars, or of service vehicles, and/or can be aircraft parts, such as window panes, in particular tailgate window panes and immovable window panes, or else headlamp lenses or diffuser lenses of vehicles, in particular of automobiles, and of aircraft and the like. Particular preference is given to transparent polycarbonate and, respectively, polycarbonate substrates, preferably with visible-light transmittance >80%. Examples of an equally suitable polycarbonate substrate are compact discs (CDs) or digital video discs or digital versatile discs (DVDs).

Application and Curing of the Coating Composition, and Coated Polycarbonate Substrates The material is applied to the substrate by standard coating processes, e.g. dipping, flow coating, spraying, spread coating, doctor-knife coating, roller coating, falling-film application processes or spincoating. It is particularly advantageous to apply the coating compositions in a dipping or flow coating process, or else by spray application methods with low layer thickness and with good flow control.

To this end, the polycarbonate substrate can be pretreated with a primer prior to application of the coating composition. Examples of suitable primers are the compositions used in the process of the invention but not comprising any nanoparticles (B). The process of the invention preferably takes place without primer-treatment of the substrate. The process of the invention particularly preferably takes place by the single-layer method, i.e. via application of only one layer of the coating composition directly onto the polycarbonate substrate which has not been chemically pretreated.

After the application of the coating, and, if appropriate, drip-drying, and then air-drying, in a manner known to the person skilled in the art, the coating is cured. The curing can take place via exposure to high-energy radiation, such as UV radiation or electron-beam radiation. Preferred radiation sources used are low-pressure mercury sources, medium-pressure sources, high-pressure sources, or else fluorescent tubes, pulsed sources, or excimer sources, which preferably emit light in the wavelength range between λ=200 and 700 nm, particularly preferably λ=200 to 500 nm and very particularly preferably λ=200 to 400 nm. Preference is further given to source systems which use reflector modification to minimize undesired heating of the substrate. Source systems of this type are known in the form of URS reflector systems from IST Metz GmbH. A radiation dose of between 100 and 6000 mJ/cm² is usually adequate for the UV curing process, particularly preferably 1000 to 4000 mJ/cm² and very particularly preferably 2000 to 3000 mJ/cm². UV irradiation intensities used, as a function of the distance between substrate and UV lamp, source power and reflector system, are between 100 and 6000 mW/cm², preferably 1000 to 4000 mW/cm² and very particularly preferably 2000 to 3000 mW/cm².

The irradiation can be carried out under an oxygen-depleted atmosphere. "Oxygen-depleted" means that the content of oxygen in the atmosphere is smaller than the content of oxygen in air (20.95% by weight). In principle, the atmosphere can also be oxygen-free, i.e. involve an inert gas. Suitable inert gases are carbon dioxide, nitrogen, noble gases or combustion gases. A preferred residual oxygen range for a UV curing process in an oxygen-depleted atmosphere is between 0.1 and 5% by weight. The coating mass can equally be irradiated under transparent media, such as plastics foils, glass or liquids. Irradiation under an oxygen-depleted atmosphere in particular has an advantageous effect on the subsequent chemicals resistance of the cured coating.

The coating and substrate are transparent after the curing process. The haze value of the coating obtained on the polycarbonate substrate, after the curing process and prior to any stress, is smaller than 1, preferably smaller than 0.8, in each case determined with the aid of a BYK-Gardner haze-gard plus C4725 device.

The haze value of the coating after exposure to stress by scratching, measured by using the Taber test in a method based on ASTM 1044-05 and ASTM 1003-00, is ≤15%, preferably ≤10%, particularly preferably ≤8%, in each case determined with the aid of a BYK-Gardner haze-gard plus C4725 device.

The functionality of the binder resin (A) should preferably be 2 to 20, more preferably 3 to 10 or 3 to 9.

The invention further provides coated polycarbonate substrates obtainable via the process of the invention. These can by way of example involve sheets, windows, spectacle lenses, optical lenses or vehicle parts and aircraft parts, protective coverings, compact discs, digital versatile discs or digital video discs. The invention also provides the coating composition used in the process, and also the use of the coating composition for the coating of in particular transparent polycarbonate substrates.

Examples are used below for further explanation of the invention.

EXAMPLES

Production of an Unsaturated, Sterically Hindered Amine Based on 2,4-bis[N-butyl-N-(1-cyclohexyloxy-2,2,6,6-tetramethylpiperidin-4-yl)amino]-6-(2-hydroxyethylamino)-1,3,5-triazine (HALS L1-1)

276.25 g of Desmodur® N3600 (commercially available, trimerized hexamethylene diisocyanate having an NCO content of 23.0% from Bayer MaterialScience AG) and 13.5 g of DBTL (dibutyltin laurate) are used as initial charge in 200 g of MEK (methyl ethyl ketone) in a 3 L laboratory reactor. At room temperature, a mixture composed of 361.26 g of Tinuvin® 152 (2,4-bis[N-butyl-N-(1-cyclohexyloxy-2,2,6,6-tetramethylpiperidin-4-yl)amino]-6-(2-hydroxyethylamino)-1, 3,5-triazine; light stabilizer commercially available from Ciba Specialty Chemicals) and 112.49 g of HEA ((2-hydroxy)ethyl acrylate) in 550 g of MEK is then added dropwise by way of a dropping funnel with pressure equalization. Once addition is complete, the reaction mixture is heated to 50° C. and kept at said temperature until all of the NCO functions have been reacted. Finally, the reaction solution is cooled to room temperature, and 0.05% of methylhydroquinone are admixed, and the mixture is discharged and the solids content is determined to DIN EN ISO 3251.
Solids content, 130° C.: 50.60%
Double-bond content (¹H NMR): 3.6 g/100 g The content of ethylenically unsaturated groups bonded by way of urethane groups in the light stabilizer here is measured experimentally with the aid of NMR spectroscopy, using a DirectDrive 500 spectrometer from Varian. A triple determination is carried out here by in each case dissolving 150 mg of the analysis specimen in 1 ml of CDCl₃ with addition of 1 mg of dimethyl terephthalate as internal standard, and recording a spectrum. To determine the NCO content, dibutylamine is admixed with a specimen, and the excess of dibutylamine is back-titrated with hydrochloric acid, using bromophenol blue as indicator.

Production of an Unsaturated, Sterically Hindered Amine Based on 2,4-bis[N-butyl-N-(1-cyclohexyloxy-2,2,6,6-tetramethylpiperidin-4-yl)amino]-6-(2-hydroxyethylamino)-1,3,5-triazine (HALS L1-2)

319.50 g of Desmolux® D 100 (commercially available, aliphatic urethane acrylate having an NCO content of 12.8% from Bayer MaterialScience AG) and 13.5 g of DBTL (dibutyltin laurate) are used as initial charge in 490 g of MEK (methyl ethyl ketone) in a 3 L laboratory reactor. At room temperature, a mixture composed of 241.50 g of Tinuvin® 152 (2,4-bis[N-butyl-N-(1-cyclohexyloxy-2,2,6,6-tetramethylpiperidin-4-yl)amino]-6-(2-hydroxyethylamino)-1,3,5-triazine; light stabilizer commercially available from Ciba Specialty Chemicals) and 189.00 g of SR 444D (commercially available pentaerythritol triacrylate from Sartomer) in 260 g of MEK is then added dropwise by way of a dropping funnel with pressure equalization. Once addition is complete, the reaction mixture is heated to 50° C. and kept at said temperature until all of the NCO functions have been reacted. Finally, the reaction solution is cooled to room temperature, and 0.05% of methylhydroquinone are admixed, and the mixture is discharged and the solids content is determined to DIN EN ISO 3251.
Solids content (60', 130° C.): 50.3%
Double-bond content (¹H NMR): 10.1 g/100 g Production of an Unsaturated, Sterically Hindered Amine Based on 2,4-bis[N-butyl-N-(1-cyclohexyloxy-2,2,6,6-tetramethylpiperidin-4-yl)amino]-6-(2-hydroxyethylamino)-1,3,5-triazine (HALS L1-3)

300.00 g of Desmodur® N3600 (commercially available, trimerized hexamethylene diisocyanate having an NCO content of 23.0% from Bayer MaterialScience AG) and 18 g of DBTL (dibutyltin laurate) are used as initial charge in 600 g of MEK (methyl ethyl ketone) in a 3 L laboratory reactor. At room temperature, a mixture composed of 390.00 g of Tinuvin® 152 (2,4-bis[N-butyl-N-(1-cyclohexyloxy-2,2,6,6-tetramethylpiperidin-4-yl)amino]-6-(2-hydroxyethylamino)-1,3,5-triazine; light stabilizer commercially available from Ciba Specialty Chemicals) and 310.00 g of SR 444D (commercially available pentaerythritol triacrylate from Sartomer) in 400 g of MEK is then added dropwise by way of a dropping funnel with pressure equalization. Once addition is complete, the reaction mixture is heated to 50° C. and kept at said temperature until all of the NCO functions have been reacted. Finally, the reaction solution is cooled to room temperature, and 0.05% of methylhydroquinone are admixed, and the mixture is discharged and the solids content is determined to DIN EN ISO 3251.
Solids content, 130° C.: 51.20%
Double-bond content ($^1$H NMR): 13.6 g/100 g Production of an Unsaturated UV Absorber Based on 2-[4-[(2-hydroxy)-3-dodecyloxypropyl]oxy]-2-hydroxyphenyl-4,6-bis(2,4-dimethylphenyl)-1,3,5-triazine (UV absorber L2-1)

296.97 g of Desmodur® N3600 (commercially available, trimerized hexamethylene diisocyanate with an NCO content of 23.0% from Bayer MaterialScience AG) and 13.5 g of DBTL (dibutyltin laurate) in 200 g of MEK (methyl ethyl ketone) are used as initial charge in a 3 L laboratory reactor. At room temperature, 332.10 g of a mixture composed of 2-[4-[(2-hydroxy)-3-dodecyloxypropyl]oxy]-2-hydroxyphenyl]-4,6-bis(2,4-dimethylphenyl)-1,3,5-triazine and 2-[4-[(2-hydroxy)-3-tridecyloxypropyl]oxy]-2-hydroxyphenyl]-4,6-bis(2,4-dimethylphenyl)-1,3,5-triazine, dissolved in 550 g of MEK (methyl ethyl ketone) are then added dropwise by way of a dropping funnel with pressure equalization. Once the addition is complete, the reaction mixture is heated to 50° C. and kept at said temperature until ⅓ of all of the NCO functions have been reacted. 120.93 g of HEA ((2-hydroxy) ethyl acrylate) are then added to the reaction solution at 50° C. and the mixture is cooled to room temperature as soon as the NCO content is 0.00%. 0.05% of methylhydroquinone is then admixed, and the mixture is discharged and the solids content is determined to DIN EN ISO 3251.
Solids content, 130° C.: 51.30%
Double bond content ($^1$H NMR): 3.5 g/100 g Production of an Unsaturated UV Absorber Based on 2-[4-[(2-hydroxy)-3-dodecyloxypropyl]oxy]-2-hydroxyphenyl-4,6-bis(2,4-dimethylphenyl)-1,3,5-triazine (UV absorber L2-2)

336 g of Desmolux® D 100 (commercially available, aliphatic urethane acrylate with an NCO content of 12.8% from Bayer MaterialScience AG) and 13.5 g of DBTL (dibutyltin laurate) in 200 g of MEK (methyl ethyl ketone) are used as initial charge in a 3 L laboratory reactor. At room temperature, 214.5 g of a mixture composed of 2-[4-[(2-hydroxy)-3-dodecyloxypropyl]oxy]-2-hydroxyphenyl]-4,6-bis(2,4-dimethylphenyl)-1,3,5-triazine and 2-[4-[(2-hydroxy)-3-tridecyloxypropyl]oxy]-2-hydroxyphenyl]-4,6-bis(2,4-dimethylphenyl)-1,3,5-triazine, dissolved in 350 g of MEK are then added dropwise by way of a dropping funnel with pressure equalization. Once the addition is complete, the reaction mixture is heated to 50° C. and kept at said temperature until ⅓ of all of the NCO functions have been reacted. 199.50 g of SR444D (commercially available pentaerythritol triacrylate from Sartomer) in 200 g of MEK are then added to the reaction solution at 50° C. and the mixture is cooled to room temperature as soon as the NCO content is 0.00%. 0.05% of methylhydroquinone is then admixed, and the mixture is discharged and the solids content is determined to DIN EN ISO 3251.
Solids content, 130° C.: 58.70%
Double bond content ($^1$H NMR): 9.7 g/100 g Pretreatment of Substrate (Polycarbonate)

As well known from the literature, rapid cooling of the substrate during the production process produces frozen-in stress. The polycarbonate to be coated is therefore destressed at 120° C. prior to application of the coating, in order to avoid stress cracking. After 1 h at said temperature, the panel is cooled and wiped clean with isopropanol.

It is moreover well known that pretreatment with UV light can improve the bond between the plastics surface and the coating. In order to obtain adequate chemical oxidation of the surface, the substrate to be coated is, in specific instances, treated with UV light (IST-Lignocure system, equipped with two UV lamps (mercury lamps) both set to 100% power, dose 1 J/cm$^2$), prior to the application process.

Inventive Example 1

Production of a Coating B1 of the Invention 2.3 g of n-butanol, 13.31 g of isopropanol, 11.40 g of ethanol, 1.61 g of Tinuvin® 400 (85% strength in 1-methoxy-2-propanol) and 5.60 g of the unsaturated, sterically hindered amine (HALS L1-1) (50.8% strength in methyl ethyl ketone) are mixed in a flat-bottomed brown glass vessel. 0.27 g of Irgacure® 819 (commercially available photoinitiator from Ciba Specialty Chemicals; bis(2,4,6-trimethylbenzoyl)phenylphosphine oxide) and 1.1 g of Irgacure® 184 (commercially available photoinitiator from Ciba Specialty Chemicals; 1-hydroxycyclohexyl phenyl ketone) are then added, with stirring. 24.02 g of Desmolux® XP 2609 (unsaturated, aliphatic polyurethane acrylate from Bayer MaterialScience AG, 70% strength in hexanediol diacrylate (HDDA), density 1.14 g/cm$^3$, viscosity @23° C. ~6000 mPa*s), 0.4 g Byk UV 3570 (commercially available flow-control additive from Byk-Chemie GmbH, solution of a polyester-modified acrylic-functional polydimethylsiloxane) and 40.0 g of Nanopol® C 784 (commercially available SiO$_2$, average particle diameter 20 nm, 50% strength in butyl acetate, obtainable from Nanoresins AG) are then added, likewise with stirring. After 15 min., the composition is applied to a polycarbonate panel, using a 36 μm metering rod. The panel is placed in the oven for 5 min at 80° C. for air drying and then cured using UV light in an IST-Lignocure system, equipped with two UV lamps (mercury lamps), both set to 100% power. The dose used to cure the coated polycarbonate panel is 2500 to 3000 mJ/cm$^2$.

Inventive Examples 2 to 3 and Comparative Examples comp1 to comp3

Production of Coatings B2 and B3 of the Invention and of Coatings compB1 to compB3 of the Comparative Examples The coatings B2 and B3 of the invention and the coatings compB1 to compB3 of the comparative examples are produced by a procedure the same as that described for the coating B1. The proportions of photoinitiator additive and flow control additive and silica here remain is constant in the coating compositions. The constituents can be found in Table 1. Apart from comparative example compB3, all of the coatings are clear and have absolutely no haze. The haze and flocculation with a rise in viscosity in the case of comparative example compB3 can be attributed to incompatibility of the sterically amine with the nanoparticles. Because of the flocculation and the rise in viscosity in the case of comparative example compB3, no further studies were carried out on that coating composition.

TABLE 1

Constitution of coating compositions of inventive examples 1 to 3 and of comparative examples comp1 to comp3, in grams

|  | Inv. ex. 1 | Inv. ex. 2 | Inv. ex. 3 | Comp. ex. comp1 | Comp. ex. comp2 | Comp. ex. comp3 |
|---|---|---|---|---|---|---|
| HALS L1-1 | 5.60 |  | 5.67[3] |  |  |  |
| Tin. 152 |  | 1.37 |  | 1.37 | 1.37 |  |
| ADK STAB LA-87[5] |  |  |  |  |  | 1.37 |
| UV abs. L2-1 |  | 6.89[2] | 6.20[4] |  |  |  |
| Tinuvin ® 400[1] | 1.61 |  |  | 1.61 |  | 1.37 |
| Tinuvin ® R796[6] |  |  |  |  | 1.37 |  |
| Desmolux ® XP2609 | 24.02 | 23.46 | 22.30 | 25.49 | 25.49 | 25.49 |
| n-BuOH | 2.3 | 2.3 | 0.4 | 2.3 | 2.5 | 2.5 |
| Isoprop. | 13.31 | 12.81 | 14.16 | 16.06 | 16.0 | 16.0 |
| EtOH | 11.40 | 11.40 | 9.50 | 11.40 | 11.5 | 11.5 |
| Irgacure ® 819 | 0.27 | 0.27 | 0.27 | 0.27 | 0.27 | 0.27 |
| Irgacure ® 184 | 1.1 | 1.1 | 1.1 | 1.1 | 1.1 | 1.1 |
| Byk UV 3570 | 0.4 | 0.4 | 0.4 | 0.4 | 0.4 | 0.4 |
| Nanopol ® C784 (50% strength in butyl acetate) | 40.0 | 40.0 | 40.0 | 40.0 | 40.0 | 40.0 |

Key to Table 1:
[1] 85% strength in 1-methoxy-2-propanol
[2] UV abs. L2-1 49.3% strength in methyl ethyl ketone
[3] HALS L1-1 49.9% strength in methyl ethyl ketone
[4] UV abs. L2-1 49.7% strength in methyl ethyl ketone
[5] ADK STAB LA-87 is a commercially available, sterically hindered amine having an acrylate function (2,2,6,6-tetramethyl-4-piperidyl methacrylate) from Adeka Palmarole
[6] Tinuvin ® R796 is a commercially availabe UV absorber having a UV-reactive acrylate function (2-(2'-hydroxy-5'-methacryloxyethylphenyl)-2H-benzotriazole.

Adhesion Test:

In order to check adhesion, the following tests were completed on the coatings of inventive examples 1 to 3 and comparative examples comp1 to comp2:

Tape Adhesion Test (ASTM D 3359 and ISO 2409)

Boil test: A bath filled with demineralized water is brought to the boil. The prepared substrates are then immersed in the boiling water for 4 hours. After 4 hours, they are removed from the water and briefly set aside for cooling. Then, a cross hatch is made and adhesion is tested using Tesa tape. Once the adhesion test has been passed (i.e. cross hatch classification <2), the coating can proceed to the water immersion test (water immersion to ASTM 870-02 and ISO 2812-2)

TABLE 2

Adhesion test results without pretreatment with UV for the coatings of inventive examples 1 to 3 and of comparative examples comp 1 to comp 2

| Example | Adhesion cross hatch classification | Boil test cross hatch classification | Boil test surface |
|---|---|---|---|
| 1 | 0 | 3 | slight haze |
| 2 | 0 | 4 | slight haze |
| 3 | 0 | 0 | clear |
| comp 1 | 0 | 5 | haze |
| comp 2 | 0 | 4 | slight haze |

TABLE 3

Adhesion test results after pretreatment with UV for the coatings of inventive examples 1 to 3 and of comparative examples comp 1 to comp 2

| Example | Adhesion GT | Water immersion GT Day 11 | Water immersion. surface | Boil test GT | Boil test surface |
|---|---|---|---|---|---|
| 1 | 0 | 0 | slight haze | 0 | slight haze |
| 2 | 0 | 0 | slight haze | 0 | slight haze |
| 3 | 0 | 0 | clear | 0 | clear |
| comp 1 | 0 | 0 | haze | 0 | haze |
| comp 2 | 0 | 0 | slight haze | 0 | slight haze |

Discussion of Adhesion Test Results:

It is clear from the adhesion test results that the covalent coupling of the light stabilizers to the binder resin matrix not only provides a clear improvement in adhesion in the boil test without pretreatment but also improves the appearance of the surface after these tests. Furthermore, when the light stabilizers, as in inventive example 3, are completely embedded into the coating matrix it is possible to omit oxidative processes, such as pretreatment with UV light.

Weathering Resistance Test

Weathering-resistance test on various clear coats in the accelerated weathering test PV3930 in accordance with specification VW PV-3920 Nov03. After in each case 1000 h of accelerated weathering, the haze value is determined to the standard ASTM D1003 and the yellowness index is determined to the standard ASTM E 313. The criterion for termination is appearance of cracks within the coating layer.

TABLE 4

Profile of haze value in % during PV3930 accelerated weathering, in each case measured prior to weathering ("0 h") and after 1000 h, 2000 h, 3000 h and 4000 h

| Example | Haze % 0 h | Haze % 1000 h | Haze % 2000 h | Haze % 3000 h | Haze % 4000 h |
|---|---|---|---|---|---|
| 1 | 0.7 | 1.3 | 1.5 | 1.8 | 2.1 |
| 2 | 0.6 | 1.1 | 1.5 | 1.9 | 2.2 |
| 3 | 0.6 | 1.3 | 1.4 | 2.0 | 2.4 |
| comp 1 | 0.8 | 1.5 | 2.0 | 2.6 | 2.7 |
| comp 2 | 1.1 | 1.8 | 2.0 | 2.4 | 2.9 |

TABLE 5

Profile of yellowness index Yi (CIE D65) during PV3930 accelerated weathering, in each case measured prior to weathering ("0 h") and after 1000 h, 2000 h, 3000 h and 4000 h

| Example | Yi (CIED65) 0 h | Yi (CIED65) 1000 h | Yi (CIED65) 2000 h | Yi (CIED65) 3000 h | Yi (CIED65) 4000 h |
|---|---|---|---|---|---|
| 1 | 1.3 | 0.8 | 1.2 | 1.0 | 1.4 |
| 2 | 2.2 | 1.7 | 1.8 | 2.1 | 2.3 |
| 3 | 1.4 | 0.8 | 0.8 | 1.0 | 1.2 |
| comp 1 | 3.0 | 2.0 | 2.4 | 2.4 | 2.3 |
| comp 2 | 3.3 | 2.4 | 2.4 | 2.8 | 2.7 |

Discussion of Weathering Test Results:

No cracks are discernible in any of the topcoats after 5000 h of PV3930 weather. Surprisingly, as is apparent from the results of Tables 4 and 5, the haze value and yellowness index for the unstressed coatings comprising the modified light stabilizers are lower than those of the unstressed coatings comprising the unmodified commercially available light stabilizers. No disadvantages caused by the fixing process are discernible during weathering.

Inventive Example 4

Production of Coating B4 of the Invention 3.25 g of n-butanol, 11.4 g of isopropanol, 6.80 g of ethanol, 2.80 g of ethyl acetate, 5.47 g of sterically hindered amine L1-1 (51.6% strength in MEK) and 6.18 g of UV absorber L2-1 (49.8% strength in MEK) are mixed in a flat-bottomed brown glass vessel. 0.27 g of Irgacure® 819 and 1.09 g of Irgacure® 184 are then added, with stirring. 9.74 g of Desmolux® VPLS 2308 (unsaturated, aliphatic polyurethane acrylate, 80% strength in hexanediol diacrylate (HDDA), density 1.11 g/cm$^3$, viscosity@23° C. ~29 000 mPa*s), 7.3 g SR 351 (commercially available trimethylolpropane triacrylate from Sartomer), 5.3 g of Ebercryl® 1290 (aliphatic polyurethane acrylate from Cytec, 100% strength, theoretical functionality 6, theoretical molecular weight 1000, density 1.19 g/cm$^3$, viscosity@60° C. 2000 mPa*s), 0.4 g Byk UV 3570 (commercially available flow control additive from Byk-Chemie GmbH, solution of a polyester-modified acrylic-functional polydimethylsiloxane) and 40.0 g of Nanopol® C 784 (commercially available SiO$_2$, average particle diameter 20 nm, 50% strength in butyl acetate, obtainable from Nanoresins AG) are added, likewise with stirring. After 15 min., the composition is applied to a polycarbonate panel, using a 36 μm metering rod. The panel is placed in the oven for 5 min at 80° C. for air drying and then cured using UV light in an IST-Lignocure system, equipped with two UV lamps (mercury lamps), both set to 100% power. The dose used to cure the coated polycarbonate panel is 2500 to 3000 mJ/cm$^2$.

Example 5

Production of Coating B5 of the Invention 3.00 g of n-butanol, 10.55 g of isopropanol, 6.30 g of ethanol, 2.64 g of ethyl acetate, 8.39 g of sterically hindered amine L1-2 (50.3% strength in methyl ethyl ketone) and 8.1 g of UV absorber L2-2 (58.7% strength in methyl ethyl ketone) are mixed in a flat-bottomed brown glass vessel. 0.270 g of Irgacure® 819 and 1.09 g of Irgacure® 184 are then added, with stirring. 8.4 g of Desmolux® VPLS 2308 (unsaturated, aliphatic polyurethane acrylate, 80% strength in hexanediol diacrylate (HDDA), density 1.11 g/cm$^3$, viscosity@23° C. ~29 000 mPa*s), 7.3 g SR 351 (commercially available trimethylolpropane triacrylate from Sartomer), 5.3 g of Ebercryl® 1290 (aliphatic polyurethane acrylate from Cytec, 100% strength, theoretical functionality 6, theoretical molecular weight 1000, density 1.19 g/cm$^3$, viscosity@60° C. ~2000 mPa*s), 0.4 g Byk UV 3570 (commercially available flow control additive from Byk-Chemie GmbH, solution of a polyester-modified acrylic-functional polydimethylsiloxane) and 40.0 g of Nanopol® C 784 (commercially available SiO$_2$, average particle diameter 20 nm, 50% strength in butyl acetate, obtainable from Nanoresins AG) are added, likewise with stirring. After 15 min., the composition is applied to a polycarbonate panel, using a 36 μm metering rod. The panel is placed in the oven for 5 min at 80° C. for air drying and then cured using UV light in an IST-Lignocure system, equipped with two UV lamps (mercury lamps), both set to 100% power. The dose used to cure the coated polycarbonate panel is 2500 to 3000 mJ/cm$^2$.

Inventive Example 6

Production of Coating B6 of the Invention 3.57 g of n-butanol, 12.50 g of isopropanol, 7.5 g of ethanol, 3.11 g of ethyl acetate, 6.81 g of sterically hindered amine L1-3 and 1.36 g of Tinuvin® R796 are mixed in a flat-bottomed brown glass vessel. 0.270 g of Irgacure® 819 and 1.09 g of Irgacure® 184 are then added, with stirring. 10.21 g of Desmolux® VPLS 2308 (unsaturated, aliphatic polyurethane acrylate, 80% strength in hexanediol diacrylate (HDDA), density 1.11 g/cm$^3$, viscosity@23° C. ~29 000 mPa*s), 7.66 g SR 351 (commercially available trimethylolpropane triacrylate from Sartomer), 5.52 g of Ebercryl® 1290 (aliphatic polyurethane acrylate from Cytec, 100% strength, theoretical functionality 6, theoretical molecular weight 1000, density 1.19 g/cm$^3$, viscosity@60° C. ~2000 mPa*s), 0.4 g Byk UV 3570 (commercially available flow control additive from Byk-Chemie GmbH, solution of a polyester-modified acrylic-functional polydimethylsiloxane) and 40.0 g of Nanopol® C 784 (commercially available SiO$_2$, average particle diameter 20 nm, 50% strength in butyl acetate, obtainable from Nanoresins AG) are added, likewise with stirring. After 15 min., the composition is applied to a polycarbonate panel, using a 36 μm metering rod. The panel is placed in the oven for 5 min at 80° C. for air drying and then cured using UV light in an IST-Lignocure system, equipped with two UV lamps (mercury lamps), both set to 100% power. The dose used to cure the coated polycarbonate panel is 2500 to 3000 mJ/cm$^2$.

Other Types of Application Process

In the case of the application process by dip coating, it is preferable to set a solids content of 50% by weight. The solvent combination used preferably comprises a mixture composed of n-butanol, ethanol, ethyl acetate, isopropanol and solvent naphtha. After an immersion time of, for example, 5 seconds, a drip-drying time of about 1 minute and air-drying time of about 5 minutes at about 80° C., an IST Lignocure system (dose 1.8 J/cm$^2$, intensity 0.3 W/cm$^2$) is used for the curing process to give coatings whose layer thickness is 9 to 14 μm.

In the case of the flow-coating application process, it is preferable to set a solids content of 50% by weight. The solvent combination used preferably comprises a mixture composed of n-butanol, ethanol, ethyl acetate, isopropanol and solvent naphtha. After a drip-drying time of about 1 minute and an air-drying time of about 5 minutes at about 80° C., an IST Lignocure system (dose 1.8 J/cm$^2$, intensity 0.3 W/cm$^2$) is used for the curing process to give coatings whose layer thickness is 9 to 12

In the case of the spray application process (nozzle: 1.3 mm, air pressure 4 bar, spray distance 20 cm) it is preferable to set a solids content of 40% by weight. The solvent combination used preferably comprises a mixture composed of ethyl acetate, butyl acetate and isopropanol. After an air-drying time of about 5 minutes at about 80° C., an IST Lignocure system (dose 3.9 J/cm$^2$, intensity 1.4 W/cm$^2$) is used for the curing process to give coatings whose layer thickness is about 7 μm.

Abrasion Resistance Test

The abrasion resistance of the surfaces was studied with the aid of the Taber test. The Taber test and the subsequent haze measurements were carried out by a method based on ASTM D1044-05 and ASTM D1003-00, but the specimens were not stored under standard atmospheric conditions at 23° C. and 50% relative humidity prior to the test.

TABLE 6

Results from testing of inventive examples 4 to 6

| Inv. ex. | Initial haze in % | Haze after Taber in % | Haze after 100 cycles in % | Initial Yi (CIED65) | Cracking in CAM 180 | Cracking in PV3930 |
|---|---|---|---|---|---|---|
| 4 | 0.3 | 8.1 | 3.1 | 0.78 | 5000 h | 5500 h |
| 5 | 0.3 | 8.0 | 2.7 | 1.35 | 5000 h | 5500 h |
| 6 | 0.5 | 11.4 | 2.8 | 1.24 | 3000 h | 3750 h |

Explanation of Table 6:

The results in Table 6 show that the coatings of inventive examples 4 and 5, in which the coating compositions comprise exclusively the light stabilizers of the invention, have better weathering resistance than the coating composition of inventive example 6, which comprises a mixture composed of a commercially available unsaturated product (L3) and of a light stabilizer of the invention.

Production of an Unsaturated UV Absorber Based on 2-[4-[(2-hydroxy)-3-dodecyloxypropyl]oxy]-2-hydroxyphenyl-4,6-bis(2,4-dimethylphenyl)-1,3,5-triazine (UV absorber L2-3)

26.4 g of Desmodur® N3600 (commercially available, trimerized hexamethylene diisocyanate having an NCO content of 23.0% from Bayer MaterialScience AG) and 1.3 g of DBTL (dibutyltin laurate) in 45.60 g of MEK (methyl ethyl ketone) are used as initial charge in a 250 mL round-bottomed flask. At room temperature, 59.10 g of a 50.2% strength mixture composed of 2-[4-[(2-hydroxy)-3-dodecyloxypropyl]oxy]-2-hydroxyphenyl]-4,6-bis(2,4-dimethylphenyl)-1,3,5-triazine and 2-[4-[(2-hydroxy)-3-tridecyloxypropyl]oxy]-2-hydroxyphenyl]-4,6-bis(2,4-dimethylphenyl)-1,3,5-triazine in methyl ethyl ketone are then added dropwise by way of a dropping funnel with pressure equalization. Once the addition is complete, the reaction mixture is heated to 70° C. and kept at said temperature until ⅓ of all of the NCO functions have been reacted.

3.77 g of HEA ((2-hydroxy)ethyl acrylate) and 9.65 g of SR444D (commercially available pentaerythritol triacrylate from Sartomer) are then added to the reaction solution at 71° C. and the mixture is cooled to room temperature as soon as the NCO content is 0.00%. 0.05% of methylhydroquinone is then admixed, and the mixture is discharged and the solids content is determined to DIN EN ISO 3251.
Solids content, 130° C.: 69.7%
Double bond content ($^1$H NMR): 8.6 g/100 g Production of an Unsaturated UV Absorber Based on 2-[4-[(2-hydroxy)-3-dodecyloxypropyl]oxy]-2-hydroxyphenyl-4,6-bis(2,4-dimethylphenyl)-1,3,5-triazine (UV absorber L2-4)

23.85 g of Desmodur® N3600 (commercially available, trimerized hexamethylene diisocyanate having an NCO content of 23.0% from Bayer MaterialScience AG) and 1.28 g of DBTL (dibutyltin laurate) in 48.60 g of MEK (methyl ethyl ketone) are used as initial charge in a 250 mL round-bottomed flask. At room temperature, 52.95 g of a 50.2% strength mixture composed of 2-[4-[(2-hydroxy)-3-dodecyloxypropyl]oxy]-2-hydroxyphenyl]-4,6-bis(2,4-dimethylphenyl)-1,3,5-triazine and 2-[4-[(2-hydroxy)-3-tridecyloxypropyl]oxy]-2-hydroxyphenyl]-4,6-bis(2,4-dimethylphenyl)-1,3,5-triazine in methyl ethyl ketone are then added dropwise by way of a dropping funnel with pressure equalization. Once the addition is complete, the reaction mixture is heated to 70° C. and kept at said temperature until ⅓ of all of the NCO functions have been reacted.

17.28 g of SR444D (commercially available pentaerythritol triacrylate from Sartomer) is then added to the reaction solution and the mixture is cooled to room temperature as soon as the NCO content is 0.00%. 0.05% of methylhydroquinone is then admixed, and the mixture is discharged and the solids content is determined to DIN EN ISO 3251.
Solids content, 130° C.: 59.8%
Double bond content ($^1$H NMR): 8.9 g/100 g Inventive Example 7

Production of Coating B7 of the Invention 3.00 g of n-butanol, 12.14 g of isopropanol, 9.03 g of ethanol, 0.19 g of methyl ethyl ketone and 11.80 g of UV absorber L2-1 (52.2% strength in methyl ethyl ketone) are mixed in a flat-bottomed brown glass vessel. 0.28 g Irgacure® 819 (commercially available photoinitiator from Ciba Specialty Chemicals; bis(2,4,6-trimethylbenzoyl)phenylphosphine oxide) and 1.09 g of Irgacure® 184 (commercially available photoinitiator from Ciba Specialty Chemicals; 1-hydroxycyclohexyl phenyl ketone) are then added, with stirring. 22.07 g of Ebercryl 1290 (unsaturated, aliphatic polyurethane acrylate from UCB Chemicals Corp., 100% strength, theoretical functionality 6, theoretical molecular weight 1000, density 1.19 g/cm$^3$, viscosity@60° C. ~2000 mPa*s, 0.4 g Byk UV 3570 (commercially available flow control additive from Byk-Chemie GmbH, solution of a polyester-modified acrylic-functional polydimethylsiloxane) and 40.0 g of Nanopol® C 784 (commercially available SiO$_2$, average particle diameter 20 nm, 50% strength in butyl acetate, obtainable from Nanoresins AG) are added, likewise with stirring. After 15 min., the composition is applied to a polycarbonate panel, using a 36 μm metering rod. The panel is placed in the oven for 5 min at 80° C. for air drying and then cured using UV light in an IST-Lignocure system, equipped with two UV lamps (mercury lamps), both set to 100% power. The dose used to cure the coated polycarbonate panel is 2500 to 3000 mJ/cm$^2$.

Inventive Examples 8 to 10 and Comparative Examples comp4 and comp5

Production of Coatings B7 to B10 of the Invention and of Coatings compB4 and compB5 of the Comparative Examples The further coatings B8 to B10 of the invention and coatings compB4 and compB5 of comparative examples comp4 and comp5 are formulated by analogy with inventive example 7. 6% of UV absorber are always used here, based on the content of binder resin plus nanoparticles. It is preferable to set a solids content of 50% by weight during the application process. The solvent combination used comprises a mixture composed of n-butanol, ethanol, butyl acetate and isopropanol. Table 7 lists the constitution of the coating compositions of inventive examples 7 to 10.

After a drip-drying time of about 1 minute and an air-drying time of about 5 minutes at about 80° C., an IST Lignocure system (dose 1.8 J/cm$^2$, intensity 0.3 W/cm$^2$) is used for the curing process to give coatings whose layer thickness is 9 to 12 μm.

TABLE 7

Constitution of coating compositions of inventive examples 7 to 12 and of comparative examples comp4 and comp5, in grams

|  | Inv. ex. 7 | Inv. ex. 8 | Inv. ex. 9 | Inv. ex. 10 | comp 4 | comp 5 |
|---|---|---|---|---|---|---|
| UV abs. L2-1[1] | 11.8 | | | | | |
| UV abs. L2-3[2] | | 9.18 | | | | |
| UV abs. L2-4[3] | | | 10.70 | | | |
| UV abs. L2-2[4] | | | | 12.49 | | |
| Tinuvin ® 400[5] | | | | | 3.21 | |
| Ebercryl 1290 ® | 22.07 | 21.83 | 21.84 | 19.10 | 25.50 | 28.24 |
| n-BuOH | 3.00 | 3.00 | 3.0 | 3.0 | 3.00 | 3.00 |
| Isoprop. | 12.14 | 12.14 | 12.14 | 12.14 | 11.66 | 12.14 |
| EtOH | 9.03 | 9.03 | 9.03 | 9.03 | 9.03 | 9.03 |
| MEK | 0.19 | 3.05 | 1.53 | 2.47 | 5.83 | 5.83 |
| Irgacure ®. 819 | 0.28 | 0.28 | 0.28 | 0.28 | 0.27 | 0.27 |
| Irgacure ® 184 | 1.09 | 1.09 | 1.09 | 1.09 | 1.1 | 1.1 |
| Byk UV 3570 | 0.4 | 0.4 | 0.4 | 0.4 | 0.4 | 0.4 |
| Nanopol ® C784[6] | 40.0 | 40.0 | 40.0 | 40.0 | 40.0 | 40.0 |

Key to Table 7:
[1]Light stabilizer described above: UV absorber L2-1, 52.2% strength in methyl ethyl ketone
[2]Light stabilizer described above: UV absorber L2-3, 69.7% strength in methyl ethyl ketone
[3]Light stabilizer described above: UV absorber L2-4, 59.8% strength in methyl ethyl ketone
[4]Light stabilizer described above: UV absorber L2-2, 73.1% strength in methyl ethyl ketone
[5]85% strength in 1-methoxy-2-propanol
[6]50% strength in butyl acetate Scratch Resistance Test Scratch resistance is tested by a method based on the Crockmeter test. The test material used is Falconbrite (FG Gold) abrasive nonwoven. The weight applied is 1 kg. The extent of damage is measured by determining the haze value (ASTM D1003) after 100 cycles.

TABLE 8

Scratch resistance of coatings of inventive examples 7 to 10 and of comparative examples comp 4 and comp 5

| Example | Haze after 100 cycles [%], applied weight 1 kg |
|---|---|
| 7 | 2.1 |
| 8 | 1.8 |
| 9 | 1.6 |
| 10 | 1.5 |
| comp 4 | 2.0 |
| comp 5 | 1.2 |

The results in Table 8 show that scratch resistance increases as the double-bond density of the crosslinkable UV absorber used increases.

What is claimed is:

1. A process for coating a polycarbonate substrate, the process comprising:
   (i) reacting an unsaturated compound (V') comprising isocyanate groups with at least one of:
      (a) a light stabilizer (L") having at least one group (LG) reactive toward isocyanate groups;
         to form a light stabilizer (L') comprising isocyanate groups;
      (b) a light stabilizer (L1") based on a sterically hindered amine and having at least one group (LG) reactive toward isocyanate groups;
         to form a light stabilizer (L1') comprising isocyanate groups;
      (c) a light stabilizer (L2") based on a UV absorber and having at least one group (LG) reactive toward isocyanate groups
         to form a light stabilizer (L2') comprising isocyanate groups; and
      (d) a mixture of: (L1") and (L2") to form a mixture of (L1') and (L2'); and
   (ii) reacting at least one of:
      the light stabilizer (L') comprising isocyanate groups;
      the light stabilizer (L1') comprising isocyanate groups; and
      the light stabilizer (L2') comprising isocyanate groups;
      with at least one of:
         a hydroxyalkyl ester of acrylic acid;
         a hydroxyalkyl ester of methacrylic acid; and
         a mixture of the hydroxyalkyl ester of acrylic acid and the hydroxyalkyl ester of methacrylic acid;
      to thereby prepare at least one light stabilizer (L); and
   (iii) applying a transparent coating composition to the polycarbonate substrate, wherein the transparent coating composition comprises:
      at least one radiation-curing binder resin (A);
      nanoparticles (B); and
      the at least one light stabilizer (L);
      optionally, a solvent; and
      optionally, a reactive diluent (C);
   wherein the at least one light stabilizer (L) has, per 100 g of the at least one light stabilizer (L), 1.0 g to 20.0 g of ethylenically unsaturated groups bonded by way of urethane groups.

2. The process of claim 1, wherein the ethylenically unsaturated group bonded by way of urethane groups is at least one of an acrylate group and a methacrylate group.

3. The process of claim 1, wherein step (ii) comprises reacting the mixture of (L1') and (L2')
   with at least one of:
      the hydroxyalkyl ester of acrylic acid;
      the hydroxyalkyl ester of methacrylic acid; and
      the mixture of the hydroxyalkyl ester of acrylic acid and the hydroxyalkyl ester of methacrylic acid;
   to thereby prepare the at least one light stabilizer (L);
   wherein
   the at least one light stabilizer (L) contain(s), per molecule, an average of at least one ethylenically unsaturated group bonded by way of urethane groups.

4. The process of claim 3, wherein the ethylenically unsaturated group bonded by way of urethane groups is at least one of an acrylate group and a methacrylate group.

5. The process of claim 1,
   wherein the unsaturated compound (V') comprising isocyanate groups comprises an average of at least 1 ethylenically unsaturated double bond per molecule and is selected from the group consisting of urethane acrylates and urethane methacrylates.

6. The process of claim 5, wherein the unsaturated compound (V') comprising isocyanate groups is selected from the group consisting of aliphatic urethane acrylates and aliphatic urethane methacrylates.

7. The process of claim 1,
   wherein step (i) comprises reacting
      the light stabilizer (L1")
         with the unsaturated compound (V') comprising isocyanate groups; and
      wherein the light stabilizer (L1") based on the sterically hindered amine is 2,4-bis[N-butyi-N-(1-cyclohexyloxy-2,2,6,6-tetramethylpiperidin-4-yl)amino]-6-(2-hydroxyethylamino)1,3,5-triazine.

8. The process of claim 1, wherein the transparent coating composition comprises 2.5% by weight to 60.0% by weight of the at least one light stabilizer (L) based on a total weight of the at least one radiation-curing binder resin (A), the nanoparticles (B), and the reactive diluent (C).

9. The process of claim 1, wherein the transparent coating composition comprises, based on a total weight of the at least one radiation-curing binder resin (A), the nanoparticles (B), and the reactive diluent (C):
- (A) greater than 0% by weight to less than or equal to 95% by weight of the at least one radiation-curing binder resin (A);
- (B) from 5% by weight to 60% by weight of the nanoparticles (B); and
- (C) from 0% by weight to 95% by weight of the reactive diluent (C), wherein the reactive diluent (C) is inert toward polycarbonate;

wherein the total weight of the at least one radiation-curing binder resin (A), the nanoparticles (B), and the reactive diluent (C) is 100%.

10. The process of claim 1, wherein the unsaturated compound (V') comprising isocyanate groups comprises an average of from 2 to 8 ethylenically unsaturated double bonds per molecule.

11. The process of claim 1, wherein the unsaturated compound (V') comprising isocyanate groups comprises an average of from 2 to 4 ethylenically unsaturated double bonds per molecule.

12. The process of claim 1, wherein the transparent coating composition comprises from 5.0% by weight to 40.0% by weight of the at least one light stabilizer (L) based on a total weight of the at least one radiation-curing binder resin (A), the nanoparticles (B), and the reactive diluent (C).

13. The process of claim 1, wherein the transparent coating composition comprises:
- (A) from 10% by weight to 80% by weight of the at least one radiation-curing binder resin (A);
- (B) from 10% by weight to 55% by weight of the nanoparticles (B); and
- (C) from 10% by weight to 70% by weight of the reactive diluent (C), based on a total weight of the at least one radiation-curing binder resin (A), the nanoparticles (B), and the reactive diluent (C);

wherein the reactive diluent (C) is inert toward polycarbonate;

wherein the total weight of the at least one radiation-curable binder resin (A), the nanoparticles (B), and the reactive diluent (C) is 100%.

14. The process of claim 1, wherein step (i) comprises reacting
the light stabilizer (L2")
with the unsaturated compound (V') comprising isocyanate groups; and
wherein the light stabilizer (L2") based on the UV absorber is a combination of 2-[4-[(2-hydroxy)-3-dodecyloxypropyl] oxy]-2-hydroxyphenyl]-4,6-bis(2,4)-dimethylphenyl)-1,3,5-triazine and 2-[4-[(2-hydroxy)-3-tridecyloxypropyl]oxy]-2-hydroxyphenyl]-4,6-bis(2,4)-dimethylphenl)-1,3,5-triazine.

15. A coated polycarbonate substrate obtained by the process of claim 1.

16. A transparent coating composition comprising:
at least one radiation-curing binder resin (A);
nanoparticles (B); and
at least one light stabilizer (L), wherein the at least one light stabilizer (L) is a reaction product of at least one of:
a light stabilizer (L') comprising isocyanate groups;
a light stabilizer (L1') comprising isocyanate groups; and
a light stabilizer (L2') comprising isocyanate groups;
with at least one of:
a hydroxyalkyl ester of acrylic acid;
a hydroxyalkyl ester of methacrylic acid; and
a mixture of the hydroxyalkyl ester of acrylic acid and the hydroxyalkyl ester of methacrylic acid;
optionally, a solvent; and
optionally, a reactive diluent (C);
wherein the light stabilizer (L') is a reaction product of a light stabilizer (L") having at least one group (LG) reactive toward isocyanate groups with an unsaturated compound (V') comprising isocyanate groups;
wherein the light stabilizer (L1') is a reaction product of a light stabilizer (L1") based on a sterically hindered amine and having at least one group (LG) reactive toward isocyanate groups with the unsaturated compound (V') comprising isocyanate groups;
wherein the light stabilizer (L2') is a reaction product of a light stabilizer (L2") based on a UV absorber and having at least one group (LG) reactive toward isocyanate groups with the unsaturated compound (V') comprising isocyanate groups;
wherein the at least one light stabilizer (L) has, per 100 g of the at least one light stabilizer (L), 1.0 g to 20.0 g of ethylenically unsaturated groups bonded by way of urethane groups.

17. The transparent coating composition of claim 16, wherein the at least one light stabilizer (L) is a reaction product of a mixture of (L1') and (L2') with at least one of:
the hydroxyalkyl ester of acrylic acid;
the hydroxyalkyl ester of methacrylic acid; and
the mixture of the hydroxyalkyl ester of acrylic acid and the hydroxyalkyl ester of methacrylic acid;
wherein
the at least one light stabilizer (L) contain(s), per molecule, an average of at least one ethylenically unsaturated group bonded by way of urethane groups.

18. The transparent coating composition of claim 17, wherein the ethylenically unsaturated group bonded by way of urethane groups is at least one of an acrylate group and a methacrylate group.

19. The transparent coating composition of claim 16, wherein the at least one ethylenically unsaturated group bonded by way of urethane groups is at least one of an acrylate group and a methacrylate group.

20. The transparent coating composition of claim 16, wherein the unsaturated compound (V') comprising isocyanate groups comprises an average of at least 1 ethylenically unsaturated double bond per molecule and is selected from the group consisting of urethane acrylates and urethane methacrylates.

* * * * *